(12) United States Patent
Nouri Esfandiari

(10) Patent No.: US 8,808,785 B1
(45) Date of Patent: Aug. 19, 2014

(54) RICE DELIGHT

(76) Inventor: Katayoun Nouri Esfandiari, Lake Forest, CA (US)

( * ) Notice: Subject to any disclaimer, the term of this patent is extended or adjusted under 35 U.S.C. 154(b) by 175 days.

(21) Appl. No.: 13/385,515

(22) Filed: Feb. 24, 2012

(51) Int. Cl.
*A23L 1/18* (2006.01)

(52) U.S. Cl.
USPC ........... 426/629; 426/459; 426/523; 426/601; 426/808

(58) Field of Classification Search
USPC .......................... 426/629, 601, 523, 459, 808
See application file for complete search history.

(56) References Cited

U.S. PATENT DOCUMENTS

| | | | |
|---|---|---|---|
| 3,656,966 A | 4/1972 | Ball et al. | |
| 3,711,295 A | 1/1973 | Zukerman | |
| 3,870,804 A * | 3/1975 | Tolson et al. | 426/618 |
| 4,623,546 A | 11/1986 | Holay et al. | |
| 4,734,289 A | 3/1988 | Yamaguchi et al. | |
| 5,871,793 A | 2/1999 | Capodieci | |
| 7,189,424 B2 * | 3/2007 | Gorski | 426/560 |

OTHER PUBLICATIONS

Journal of Food Service, vol. 66, No. 4, p. 610, 2001.
Agriculture Reasearch—Feb. 1996 by Jill Lee, ARS www.ars.usda.gov/is/ar/archive/feb96/fries0296pdf

* cited by examiner

*Primary Examiner* — Helen F Heggestad
(74) *Attorney, Agent, or Firm* — Mastermind IP Law P.C.; Diane L. Gardner

(57) ABSTRACT

The invention is a high fiber puffed rice snack food that may be hand made using unique steps that include fully cooking white rice (rice endosperm), drying the white rice, and then frying the dry white rice. The process produces a unique form of puffed rice that has a distinctive unique flavor and appearance. When long grain white rice is used the puffed rice product is more fluffy and puffy product as compared to when medium grain or short grain white rice are used. The medium grain white rice product tends to have a firmer texture, and the short grain white rice tends to be sticker. After the product is fried it may be flavored with salt, with syrup, or with other desired flavorings or additives.

20 Claims, 1 Drawing Sheet

Rice Kernel

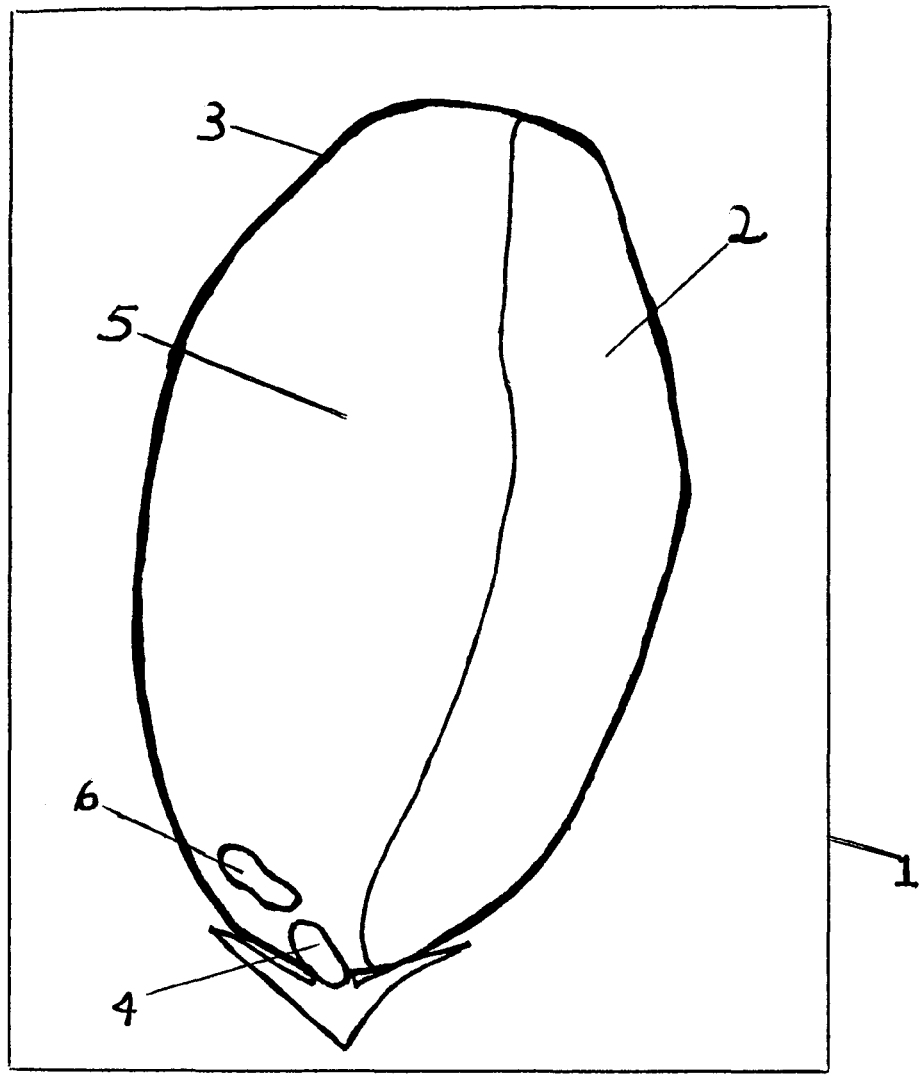
Rice Kernel under expanding conditions;
RICE DELIGHT

BACKGROUND OF THE INVENTION

Prior art teaches how to make shaped dry rice products such a dried rice chips, dry rice cakes, and dry puffed crisp rice particles. These shaped dry rice products are all made with finely milled rice flour and have moisture contents of at least 10%. The prior art teaches how to make rice Krispies bars and granola which are comprised of puffed rice grains and/or low density pieces of puffed crisp rice pieces that are joined to each other with a syrup binder.

A prior art process for making rice fries from rice flour and water was developed by the USDA-ARS in New Orleans, La. and published in the Journal of Food Service volume 66, No. 4, page 610. The USDA teaches a process for extruding rice flour together with a comparatively small amount of water through a high shear, fast rotating screw-type extruder to form rice fries strands which are then fat-fried. According to this referred article, the USDA process is able to make rice strands with less than 40% moisture which when fat-fried produced finished products i.e. par-fried rice fries having 20-30% moisture. The fries have to be cooked like regular French fries. Typically they are fried in oil at a factory site and shipped frozen to consumers who would re-heat them in a microwave or in a conventional oven. This process substantially increases the cost of manufacturing and thus limits the market potential of such a product.

In the 1980s researchers at a USDA-ARS laboratory in Berkeley, Calif. developed a frozen rice product that was covered with another layer of ground potato flakes and deep fried. This product was made using rice kernels, not rice flour.

U.S. Pat. No. 3,656,966 teaches a process for making a ready-to-eat food chips from cereal grains such as wheat or rye by cooking a mixture of whole wheat or whole rye that has been cut into pieces. Water and other grains, including rice or other grains are added and the combined grains and water are mixed into dough. Individual pieces of dough are formed and then are deep fried in oil. During the deep frying process the dough expands, puffing the pieces of dough as they cook.

U.S. Pat. No. 3,711,295 teaches a process for making shaped rice products that have a "homogenous consistency" interior texture like French fried potatoes.

U.S. Pat. No. 4,623,546 teaches a process for making rice products comprising the steps of:

a) Extrusion cooking a moist mix of ingredients comprising at least 50% uncooked rice flour on a dry weight basis in a screw-type extruder. The screw-type extruder includes an elongated barrel having a feed end, a discharge end, and a passage way. A single elongated rotatable screw is snugly mounted within the passage way and is typically coated with an anti-stick coating;
b) Expressing the mix from the extruder through a die under expanding conditions;
c) Cutting the expressed mix into discrete pieces;
d) Drying the cut pieces; and
e) Toasting the dried pieces.

Crisped rice is a product frequently used in the manufacture of crisp candy bars, cookies, granola bars and other snacks and confections in addition to its well-known use as a breakfast food. A typical crisp rice process is an oven-fluffy (puffing) process which begins with whole kernels of rice. The rice kernels are first cooked in a retort for several hours together with sugar, salt, and malt. The cooked kernels are then dried to a moisture content of 25% to 30%, tempered for about 15 hours to equilibrate moisture and dried again to a moisture content of 18 to 20%. The dried kernels are then radiantly heated to plasticize the outside layers of the kernel, "bumped" O on widely spaced flaking rolls, and a tempered for 24 hours. The bumped kernels are then finally puffed and toasted in a toasting oven for 30 to 40 seconds. Such an oven puffing rice crisp process is expensive as it has the disadvantage of containing many steps of moderate complexity.

U.S. Pat. No. 4,734,289 teaches a process for food material for puffing compressed pre-gelatinized cereal grains, 0.2 to 11% by weight of ethyl alcohol, 0.25 to 16% by weight of fat and/or oil, with a water content of 5 to 45% by weight. The food material is used as a breakfast food or snack as well as making rice crackers.

U.S. Pat. No. 5,871,793 teaches a process for the preparation of puffed cereal cakes. The process comprises molding puffed or un-puffed cereal grains under pressure with the application of ultrasound. The ultrasound assists bonding of the cereal grains to form a solid cake. The ultrasound reduces failing of the mold and increases processing speed. In one embodiment pre-puffed cereal grains that are coated with a binder agent and ultrasound is used to bond the grains together at a low temperature. The ultrasound enables temperature sensitive foodstuffs to be bonded into puffed cereal cakes quickly without damaging the sensitive foodstuffs. High temperatures are associated with the process, however. Limitations of the process include costly molds and the potential for carbon deposits forming on the molds. Molds used in this process must be able to withstand high pressures and temperatures, and they must expand during the puffing process, such molds are costly. The high temperatures also cause carbon deposits to build up on the molds.

U.S. Pat. No. 7,189,424 describes a process for making rice-based snack chips made from dough that contains at least two different forms of rice mixed with water. Rice kernels, long-grain pre-gelatinized rice flour, medium-grain course rice flour that are first bumped then partially dehydrated and then fried.

The related art reviewed above are examples of processes for making puffed rice foodstuffs or snacks using rice kernels, rice flour, milled rice flour, compressed pre-gelatinized cereal grains or rice grains, or whole cereal grains or rice grains and not milled rice or white rice.

Milled rice or white rice are predominantly comprised of the food part of the rice kernel known as rice endosperm. Rice kernels include an outer husk and other inner parts. The outer husk includes parts known as the lemma, palea, and rachilla. The inner parts of the rice kernel are the endosperm and the embryo. What is commonly referred to as brown rice includes both the endosperm and the embryo, where white rice includes the endosperm and not the embryo. The endosperm is the white nutritive tissue of the rice seed that is absorbed by the embryo during growth of the embryo into a plant. The embryo is also referred to as the germ.

FIELD OF THE INVENTION

The invention is in the field of making puffed rice foodstuffs.

The invention is a high fiber puffed rice snack food that may be made by hand using specific unique steps using rice endosperm instead of using rice kernels, rice flour, compressed pre-gelatinized cereal grains, or whole cereal grains. The rice snack has a unique taste that immediately distinguishes it from other puffed rice foodstuffs. Rice is known as a good source of fiber and fiber has significant documented health benefits.

SUMMARY OF THE INVENTION

The invention is a high fiber puffed rice snack food that may be hand made using unique steps that include fully cooking white rice (rice endosperm), drying the white rice, and then frying the dry white rice. The process produces a unique form of puffed rice that has a distinctive unique flavor and appearance. When long grain white rice is used the puffed rice product is more fluffy and puffy product as compared to when medium grain or short grain white rice are used. The medium grain white rice product tends to have a firmer texture, and the short grain white rice tends to be sticker.

After the product is fried it may be flavored with salt, with syrup, or with other desired flavorings or additives.

DETAILED DESCRIPTION OF THE INVENTION

The invention is a high fiber puffed rice snack food that may be hand made using unique steps that include fully cooking white rice (rice endosperm), drying the white rice, and then frying the dry white rice. The process produces a unique form of puffed rice that has a distinctive unique flavor and appearance. When long grain white rice is used the puffed rice product is more fluffy and puffy product as compared to when medium grain or short grain white rice are used. The medium grain white rice product tends to have a firmer texture, and the short grain white rice tends to be sticker.

Related art uses rice kernels, rice flour, milled rice flour, compressed pre-gelatinized cereal grains or rice grains, or whole cereal grains or rice grains and not what is commonly referred to as milled rice or white rice for making puffed rice foodstuffs or snacks. The invention is distinct in that it uses white rice instead of rice kernels, rice flour, milled rice flour, compressed pre-gelatinized cereal grains or rice grains, or whole cereal grains or rice grains. Milled rice or white rice are predominantly comprised of the food part of the rice kernel known as rice endosperm.

FIG. 1 shows a rice kernel 1 including an outer husk and other inner parts. The outer husk includes parts known as the lemma 2, palea 3, and rachilla 4. The inner parts of the rice kernel are the endosperm and the embryo. What is commonly referred to as brown rice includes both the endosperm 5 and the embryo 6, where white rice includes the endosperm 5 and not the embryo 6. The endosperm 5 is the white nutritive tissue of the rice seed that is absorbed by the embryo 6 during growth of the embryo 6 into a plant. The embryo 6 is also referred to as the germ.

Examples of embodiments of the invention follow; the invention is not limited to these embodiments.

A first example of an embodiment of the invention is described below;
a) Wash white rice with cold water.
b) Put the white rice in a bowl and let it set (sleep) for a period of time typically not exceeding 24 hours.
c) Dispose of the water that the white rice slept in.
d) Place the white rice in a rice cooker and add fresh water.
e) Fully cook the white rice.
f) Remove the cooked white rice from the rice cooker.
g) For a few moments rinse the cooked rice with cold water.
h) Place the white rice a refrigerator or in a cool place in a container where it can drain, let sit for a time typically for a time not exceeding 12 hours.
i) Place the cool drained white rice in a drier.
j) When the white rice is completely dry (preferably to 0% moisture content) deep fry the white rice in hot oil for a few seconds.

A second example of an embodiment of the invention is described below:
a) Wash white rice with cold water.
b) Put the white rice in a bowl and let it set (sleep) for a period of time typically not exceeding 24 hours.
c) Boil fresh water in a pot.
d) Dispose of the water that the white rice slept in.
e) Place the white rice in the pot and fully cook the white rice.
f) Drain the water from the pot.
g) For a few moments rinse the cooked rice with cold water.
h) Place the white rice a refrigerator or in a cool place in a container where it can drain, let sit for a time typically for a time not exceeding 12 hours.
i) Dry the cool drained white rice.
j) When the white rice is completely dry (preferably to 0% moisture content) deep fry the white rice in hot oil for a few seconds.

Typically the volume of boiled water is three times the volume of the white rice that will be cooked.

The white rice may be cooked by any process standard in the art including yet not limited to boiling, steaming, or cooking in a rice cooker.

The rice may be dried by placing it on a fabric and letting it sit, placing it in an oven at a warm temperature, by placing it in a dehydrator, or by other means known to one of average skill in the art.

After the white rice is fried it may be flavored with salt, with syrup, or with other desired flavorings or additives.

Although the disclosure herein refers to certain disclosed embodiments, it is to be understood that these embodiments have been presented by way of example rather than limitation. Corresponding or related structure and methods specifically contemplated, disclosed and claimed herein as part of this invention, to the extent not mutually inconsistent as will be apparent from the context, this specification, and the knowledge of one skilled in the art, including, modifications thereto, which may be, in whole or in part, (i) operable and/or constructed with, (ii) modified by one skilled in the art to be operable and/or constructed with, and/or (iii) implemented/made/used with or in combination with, any parts of the present invention according to this disclosure, include: (I) any one or more parts of the above disclosed or referenced structure and methods and/or (II) subject matter of any one or more of the following claims and parts thereof, in any permutation and/or combination include the subject matter of any one or more of the following claims, in any permutation. The intent accompanying this disclosure is to have such embodiments construed in conjunction with the knowledge of one skilled in the art to cover all modifications, variations, combinations, permutations, omissions, substitutions, alternatives, and equivalents of the embodiments, to the extent not mutually exclusive, as may fall within the spirit and scope of the invention as limited only by the appended claims.

BRIEF DESCRIPTION OF THE DRAWINGS

FIG. 1 shows the parts of a rice kernel 1 including the lemma 2, the palea 3, the rachilla 4, the endosperm 5, and the embryo 6.

The invention claimed is:
1. A puffed rice product made by a process comprising:
a) soaking clean, milled, white rice in water;
b) draining said water from said milled white rice;
c) cooking said milled white rice in fresh water until completely cooked;
d) rinsing said cooked milled white rice with cold rinse water;
e) draining said rinse water from said cooked milled white rice;
f) drying said cooked, milled white rice to about 0% moisture content making dry, cooked, milled white rice; and, g) frying said dry, cooked, milled white rice in cooking oil creating puffed, milled white rice.

2. The puffed rice product of claim 1 further comprising adding flavoring to said puffed, milled white rice.

3. The product of claim 1 wherein the cooking step comprises boiling or steaming.

4. The product of claim 3 wherein the cooking step is carried out using a rice cooker or a retort.

5. The product of claim 1 wherein the drying step comprises placement of said cooked, milled white rice on fabric at ambient temperature.

6. The product of claim 1 wherein the drying step comprises placement of the cooked, milled white rice in a warm oven.

7. The product of claim 1 wherein the drying step comprises placement of the cooked, milled white rice in a dehydrator.

8. The product of claim 1 wherein the milled white rice is long grain.

9. A process comprising:
a) soaking clean milled white rice in water;
b) draining said water from said milled white rice;
c) cooking said milled white rice in fresh water until completely cooked;
d) rinsing said cooked milled white rice with cold rinse water;
e) draining said rinse water from said cooked milled white rice;
f) drying said cooked, milled white rice to about 0% moisture content making dry, cooked, milled white rice; and,
g) frying said dry, cooked, milled white rice in cooking oil creating puffed, milled white rice.

10. The process of claim 9 further comprising adding flavoring to said puffed, milled white rice.

11. The process of claim 9 wherein the cooking step comprises boiling or steaming.

12. The process of claim 11 wherein the cooking step is carried out using a rice cooker or a retort.

13. The process of claim 9 wherein the drying step comprises placement of said cooked, milled white rice on fabric at ambient temperature.

14. The process of claim 9 wherein the drying step comprises placement of the cooked, milled white rice in a warm oven.

15. The process of claim 9 wherein the drying step comprises placement of the cooked, milled white rice in a dehydrator.

16. The process of claim 9 wherein the milled white rice is long grain.

17. In a process for creating a rice product comprising the steps of soaking clean, milled white rice in water; draining said water from said milled white rice; cooking said milled white rice in fresh water until completely cooked; rinsing said cooked, milled white rice with cold rinse water; and draining said rinse water from said cooked, milled white rice; the improvement comprising drying said cooked, milled white rice to about 0% moisture content and frying said dry, cooked, milled white rice in cooking oil until puffed.

18. The process of claim 17 wherein the drying step comprises placement of the cooked, milled white rice on fabric at ambient temperature.

19. The process of claim 17 wherein the drying step comprises placement of the cooked, milled white rice in a warm oven.

20. The process of claim 17 wherein the drying step comprises placement of the cooked, milled white rice in a dehydrator.

* * * * *